United States Patent
Risse

[15] 3,692,427
[45] Sept. 19, 1972

[54] HIGH SPEED MIXING IMPELLER

[72] Inventor: Jean Risse, Medingen, Grand Duchy, Luxembourg

[73] Assignee: Colortex S.A., Grand Duchy, Luxembourg

[22] Filed: July 13, 1970

[21] Appl. No.: 54,381

[52] U.S. Cl. .................. 416/143, 416/101, 416/105
[51] Int. Cl. ................................................. B01f 7/24
[58] Field of Search ........ 259/8, 23, 43, 44, 107, 108; 416/143, 142, 101, 105, 103, 104, 106

[56] References Cited

UNITED STATES PATENTS

| | | | |
|---|---|---|---|
| 1,757,761 | 5/1930 | Wendt | 416/143 |
| 2,041,103 | 5/1936 | Zegers | 416/101 |
| 2,957,526 | 10/1960 | Derschmidt | 416/105 |
| 3,011,768 | 12/1961 | Clark | 259/108 |
| 3,156,278 | 11/1964 | Otto | 259/107 X |
| 3,216,042 | 11/1965 | Strittmatter | 259/107 X |
| 3,322,401 | 5/1967 | Mersch | 416/110 |

FOREIGN PATENTS OR APPLICATIONS

| | | | |
|---|---|---|---|
| 782,935 | 3/1935 | France | 416/143 |

*Primary Examiner*—Everette A. Powell, Jr.
*Attorney*—John J. Dennemeyer

[57] ABSTRACT

A mixing impeller having vanes mounted at the periphery of a supporting disc, each vane having a root section by which it is pivotally mounted to the disc and an arm extending from the root section. The arms are shaped to correspond substantially to the shape of the supporting disc periphery and the sum of the peripheral developments of all the arms is greater than the periphery of the supporting disc.

2 Claims, 3 Drawing Figures

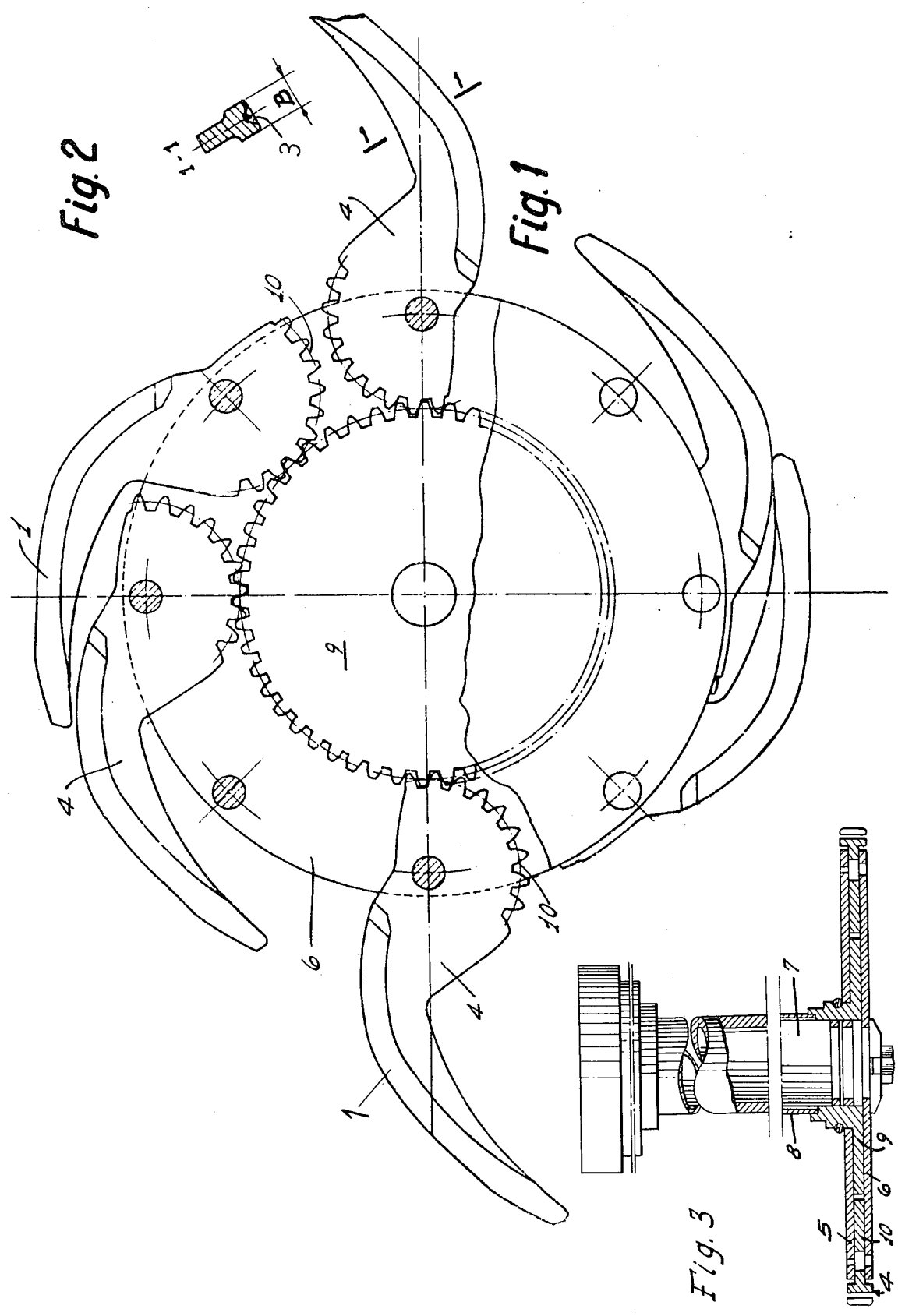

HIGH SPEED MIXING IMPELLER

The invention relates to high speed mixing impellers which may be of the fixed vane type or the adjustable vane type.

The adjustable vane type impeller comprises a vane supporting disc having equally spaced pivots positioned near its periphery. The vanes are pivotably mounted on the pivots and comprise a gear segment and a vertical portion located at the opposite side of said gear segment. A bore is formed in the gear segment of each vane for receiving the pivot about which the gear segment may be rotated. An arm extends from one of the ends of the gear segment, is positioned on the opposite side of the teeth of the gear segment, and is shaped to correspond to the outer periphery of the support disc so as to form an arm which is parallel with respect to the horizontal disc. Each vane arm comprises an outer surface extending normal with respect to the horizontal main plane of the support disc, and this surface is referred to as "vertical surface" in the following description. All the mixing vanes arranged on the supporting disc are shaped so that the arms occupy substantially the whole disc periphery or approximately the total development of the periphery.

The gear segment of the mixing vanes mesh by means of their teeth with a gear mounted at the center of the supporting disc to be parallel with respect thereto. The gear has an opening through which the mixer shaft extends and about which the gear may be rotated. A covering disc having substantially the same dimensions as the supporting disc is disposed on the gear and on the gear segments of the mixing vanes.

The two discs and the gear have central and aligned openings through which a hollow hub may be inserted. This hollow hub has on its lower end a flange for retaining the lower supporting disc. The upper end of the hollow hub has an outer thread on which a nut may be screwed in order to lock, if desired, the gear and the gear segments and the mixing vanes between both discs to retain the mixing vanes in selected predetermined positions. The hollow hub serves to receive a drive shaft on which the impeller is permanently fixed.

By unscrewing the nut of the impeller, the gear may be released so that all the gear segments of the mixing vanes are free for a simultaneous pivot motion and a corresponding adjustment of the vane arms. The vane arms may be placed at a selected angle with respect to the tangent at a given point of the discs and this angle may be varied at the same time as the operating diameter of the impeller is modified.

The vanes are adjusted at the required angle according to the parameters of the specific operation and the expected results.

The above described adjustment operation is carried out when the mixing impeller and the drive machine are not rotating.

It is, however, also possible to connect the impeller to a dephasing device comprising two concentric shafts, one of which is connected to the gear and the other, for example, to the vane supporting disc. The two concentric shafts may be driven at differential speeds to obtain a differential rotation of one shaft with respect to the other, thereby producing the desired dephasing at rest as well as during operation of both shafts. It is therefore also possible to produce a differential rotation between the gear and the supporting disc for the mixing vanes so that the gear rotates the gear segments of the mixing vanes whose arms then move toward or away from the outer periphery of the supporting disc.

The object of the present invention is to produce a construction for a mixing impeller wherein the vertical surface of the vanes is no longer limited to the impeller disc periphery, without effecting the operating parameters of the mixing impeller.

An embodiment of the invention will now be described with reference to the drawings, in which:

FIG. 1 is a top view of a mixing impeller with overlapping vanes according to the invention.

FIG. 2 is a sectional view through a vane arm along line 1—1 of FIG. 1.

FIG. 3 is a sectional view of a mixing impeller connected to a dephasing device to actuate the gear and vanes at rest or in motion.

It is an important feature of the invention that the vane arm 1 is modified and, more particularly, is extended so that the extremity of the arm of each vane overlaps a portion of the next adjacent vane so that all the mixing vanes 4 of an impeller have a development of their vertical surfaces which is no longer equal but substantially greater than the periphery of the impeller discs 5 and 6.

However, with this increase of the vertical surfaces a substantial increase of the starting power for the mixing impeller must be taken into consideration for the various stages of opening of the impeller vanes.

In order to prevent this increase of the starting power the height B (see FIG. 2) of the vertical surfaces is diminished in an inverse proportion corresponding approximately to the increase of the peripheral development of the vertical surfaces with respect to the periphery of the impeller disc 5 or 6 2.

In accordance with a preferred feature of the invention at least one of the vanes is provided with a groove or channel 3 (see FIG. 2) extending along the vertical surfaces and approximately at the center thereof. The channel or groove forms a preferred flow path for the material to be treated.

From the foregoing description, a person skilled in the art will recognize that the overlapping of the vanes, the appropriate dimensioning of the vertical surfaces of the vanes and the formation of the channel for the preferred flow path in the vertical surfaces creates operating conditions, which, without increase of the starting power, produce on the vertical surfaces a reduced but faster flow of material and lead to higher ejection speeds of the material at the extreme edges of the mixing vanes.

Since it is the ejection speed which conditions the industrial efficiency of a mixing impeller, it is evident that the invention provides a considerable technical progress.

In particular the channel for the preferred flow path provides a better orientation of the flow path, a control of the flow volume and a centering action toward the vane middle, preferably to the edges of the same. Finally it is possible to localize maximum wear at that section of the vanes which insures their longest operating life.

As already explained above the position of the vane arms may be adjusted at rest or in motion. A construction which enables this is shown in FIG. 3 wherein a first shaft 7 is attached to the disc 6. A second shaft 8 is fixed to the gear 9 which is in engagement with the gear segment 10 of each of the vanes 4 (see also FIG. 1). Due to a differential rotation between shafts 7 and 8 the position of the vane arms 1 may be varied at rest or in motion.

What I claim is:

1. A mixing impeller comprising:
   a. a supporting disc having a peripheral curvature;
   b. a plurality of vanes pivotally mounted on said supporting disc, each vane having an arcuate vane arm with an outer curvature corresponding substantially to said peripheral curvature of said supporting disc, each vane having a peripheral development dimension;
   c. A gear segment on one end of each vane and a free end opposite said one end, said gear segment engaging a gear means mounted co-axially with respect to said supporting disc, said gear means being effective to move said vanes between a closed and an opened position;
   d. the sum of the peripheral developments of all of said vanes being greater than the periphery of said supporting disc whereby the free end of each vane arm overlaps said one end of an adjacent vane arm when said vanes are in the closed position;
   e. each of said vanes having an outer surface with a channel extending therealong to form a preferred flow path for the material to be treated.

2. A mixing impeller as defined in claim 1 including a dephasing device having two concentric shafts driveable at differential speeds, one of said shafts being connected to said supporting disc, the other of said shafts being connected to said gear means to actuate both said gear means and said gear segments of said vanes to in turn actuate said vane arms when the impeller is either at rest or in motion.

* * * * *